United States Patent Office 2,947,024
Patented Aug. 2, 1960

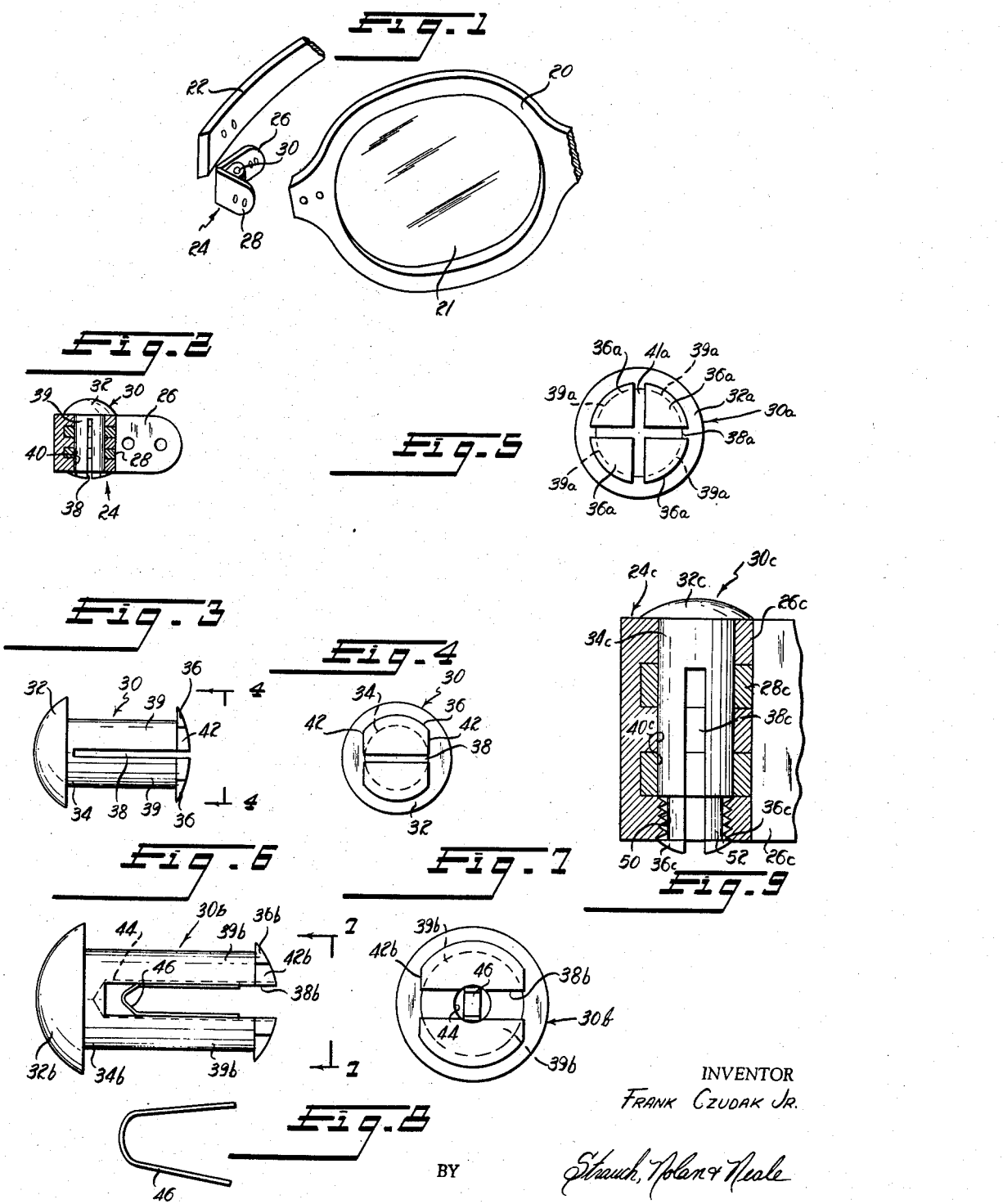

2,947,024
SPECTACLE HINGE AND PIVOT STUD THEREFOR
Frank Czudak, Jr., % Acme Precision Screw Products, Inc., 623 Glide St., Rochester, N.Y.
Filed Nov. 6, 1956, Ser. No. 620,683
10 Claims. (Cl. 16—168)

This invention relates to a spectacle hinge device, and more particularly to a threadless spectacle hinge and a new type hinge stud that serves as a combined pivot and fastener.

Heretofore, except for some unsatisfactory efforts at alternatives hereinafter discussed, spectacles have generally employed a screw hinge between the lens frame and the temple frame members. The screw hinge, however, has been one of the biggest problems in the optical frame industry.

There has been a big consumer problem because the screws frequently back out of the hinge in use so that the spectacle becomes disassembled. When this happens, the spectacle owner usually has to pay an average fee of $1.00 to an optician to reassemble the frame. Often the wearer does not realize that the hinge screw has worked out until the spectacles fall, frequently breaking one or both lenses, so that the loosening and loss of the hinge screw may result in a sizeable repair bill.

There is also a big problem from the viewpoint of the optical manufacturers. Loss of a hinge screw and lens breakage results in loss of good will for the frame manufacturer; this is of special concern to the leading companies which widely advertise their optical products. Many optical manufacturers have people frequently coming to the plant or writing to request screws for replacement; this is disruptive and costly to the manufacturer. Tapping the frame hinge to receive the pivot screw is the slowest and most costly operation in the manufacture of such hinges. And the assembly of the small screw in the hinge is relatively slow and one of the costliest assembly operations in the manufacture of spectacle frames. Also, many screws are lost in assembly because of their small size and the difficulty of handling them, further increasing the cost of spectacle frames (according to the plant superintendent of a medium sized optical companay, his company loses 2 to 3 million of such screws each year in assembly operations).

Some optical manufacturers consider the problem of loosening and lost hinge screws their single biggest headache, and many efforts have been heretofore made by leading companies in the optical frame industry to solve this problem.

Some years ago, a well known optical company sold at cost to dispensing opticians a kit including pellets of solder and necessary equipment which enabled the optician to solder the hinge screw firmly in place. This was originally well received by opticians until soldered frames were returned for repairs or replacement of lenses. The opticians then discovered it was a slow tedious operation to remove the soldered screw, and a large percentage of the frames were ruined in the process, necessitating new frames. As a result, this method was quickly obsoleted because of the work and expense involved.

In another attempt to solve the problem, many of the optical frame manufacturers have countersunk a small hole in either or both ends of the hinge screw so that the dispensing optician could spread the end of the hole with the aid of a punch to keep the screw from becoming loosened. One well known company went so far as to supply the counterpunches to the opticians. This method, however, did not go into widespread use because it required an additional operation by the manufacturer and extra work on the part of the optician, and also presented a problem in removal of the hinge screw for servicing. Another well known optical company at one time marketed a screw that was similarly countersunk and then spun over similar to riveting. This company supplied the equipment for this spinning operation at cost. Because of the additional operations required of both the manufacturer and the dispensing optician and the problems presented in removal of the screws for service, this method was never used extensively.

In still another effort to solve the problem of loosening and lost hinge screws, one of the leading optical frame manufacturers in the United States has been marketing a screw which has two ears on the head end. After the screw is assembled the ears are bent to lock the screw in place. This device also involves additional manufacturing costs and presents the problem of addition work and trouble for the optician when the screw has to be removed for service.

It is a primary purpose of the present invention to provide a novel threadless spectacle hinge, and a combined fastener and pivot stud therefor that eliminate the problems and disadvantages of prior screw threaded spectacle hinge pivot fasteners and alternative prior devices such as those above described.

It is a principal object of the present invention to provide a novel threadless hinge pivot stud and fastener that is securely locked in place so that it cannot fall out of the spectacle hinge, thereby preventing unintentional disassembly of the spectacle and lens breakage.

It is another object of the present invention to provide a new hinge pivot stud that can be quickly and easily inserted into, and removed from, the spectacle hinge for factory assembly and servicing, without special or costly tooling. It is a related object of the present invention to provide a new spectacle hinge with a new pivot stud that is easy and simple for the dispensing optician to handle so that it can gain widespread acceptance.

It is a further object of the present invention to provide a novel threadless spectacle hinge and pivot stud fastener therefor which enable the manufacturer to realize substantial savings by eliminating the costly tapped hole in the spectacle hinge and the slow and costly assembly of prior hinge screws.

It is still another object of the present invention to provide a novel hinge pivot and fastener means of such construction that it lends itself to good production control of close tolerances in the order of .001 of an inch insisted upon by the optical industry. It is a related object to provide such a hinge pivot stud and fastener that can be manufactured at low cost by existing high volume production machinery.

It is still another object of the present invention to provide for spectacles a hinge pivot stud and fastener that maintains its round shape in the frame assembly to assure friction and take up wear between the stud and hinge hole so that the lens frame will remain snug with the temple frame members and will not sag.

It is a further object of this invention to provide a modified form of my novel threadless pivot and fastener stud which can be used in conventioinal screw threaded spectacle hinges without drilling out the thread in the hinge, so that opticians can readily use the stud for replacement of unsatisfactory prior type threaded pivot fasteners.

These and other objects and advantages of the present invention will be apparent to those familiar with the art from a reading of the following description and appended claims in conjunction with the annexed drawings in which:

Figure 1 is an exploded fragmentary perspective view of part of a spectacle frame, showing part of the lens frame, part of one of the temple frame members, and the hinge for connecting them;

Figure 2 is a cross-sectional view of a spectacle hinge incorporating a new hinge pivot and fastener stud according to the present invention;

Figure 3 is a side view of one embodiment of hinge pivot stud and fastener according to the present invention;

Figure 4 is an end view of the stud embodiment shown in Figure 3, looking along lines 4—4 in that figure;

Figure 5 is an end view similar to that of Figure 4 showing another embodiment of hinge stud according to the present invention;

Figure 6 is a side view of still another embodiment of hinge stud according to the present invention;

Figure 7 is an end view of the hinge stud embodiment shown in Figure 6 looking along lines 7—9 in the figure;

Figure 8 is a side view of a wire spring utilized in the hinge stud shown in Figures 6 and 7; and Figure 9 is an enlarged cross-sectional fragmentary view of a conventional threaded spectacle hinge incorporating a modified embodiment of my hinge pivot and fastener invention usable without drilling out the threaded section of the conventional hinge.

Referring to Figure 1, there is shown a spectacle lens frame 20 with a lens 21 therein, a temple frame member 22, and a hinge generally indicated at 24. The hinge 24 includes a pair of hinge members 26 and 28 secured together by a hinge pivot stud and fastener 30. In an assembled spectacle frame, the hinge 24 is secured to the temple frame members 22 and lens frame 20 by rivets in a manner well known in the art.

Referring to Figures 2–4, the pivot stud and fastener 30 comprises an enlarged head 32, an unthreaded cylindrical shank 34, and protrusion 36 at the other end of said shank. In a commercial embodiment, shank 34 would usually have a diameter in the order of .060 of an inch and the diameter across protrusions 36 would be in the order of .068 of an inch. The stud shank 34 is provided with a longitudinal slot 38 extending part way up the shank from the protrusion end; and in a typical embodiment this slot would be in the order of .008 inch wide. The slot 38 thus forms a pair of opposed resilient shank legs 39 that can be compressed towards each other to reduce the diameter across protrusions 36.

Referring especially to Figure 2, the hinge hole 40 is formed by mating bores in the hinge frame sections 26 and 28 in a manner well known in the art. Unlike the hinges heretofore in use, however, the hole 40 is not threaded. To assemble the hinge pivot stud 30 in hinge hole 40, the stud is simply pushed axially into the hinge hole, and the stud slot 38 permits legs 39 to compress so that the stud can be forced into the hole. When the protrusions 36 reach the other side of hinge hole 40, legs 39 will spring back into normal position shown in the drawings, and protrusions 36 and head 32 will cooperate to keep stud 32 securely in the hinge hole as will be apparent from Figure 2.

Referring particularly to Figure 4, it will be apparent that when the stud 30 is inserted into the hinge hole 40, which is usually .060 inch in diameter, the protrusion end of the stud will compress along its diameter perpendicular to the slot 38. The protrusions 36, however, will not compress along the diameter coinciding with the axis of the slot 38. Accordingly, a pair of flats 42 are broached on the sides of protrusion 36 along substantially parallel lines perpendicular to the slot 38 and of the same distance apart as the diameter of the stud shank 34. This enables easy insertion and removal of the pivot stud 30 from the hinge hole 40, while still maintaining stud shank 34 round so that pivot stud 30 will closely fit in the hinge hole 40.

The hinge pivot stud 30 can be easily removed with tweezers when necessary, by pushing protrusions 36 together to compress the stud legs 39 in a manner that will be clear from the foregoing description.

In Figure 5 there is shown a modified pivot stud embodiment indicated at 30a. This stud is generally similar to the described embodiment of Figures 2–4, and for convenience and clarity like parts in Figure 5 are identified by same numerals as the corresponding parts in the embodiments of Figures 2–4 with the subscript a.

Pivot stud 30a comprises an enlarged head 32a, a cylindrical shank 34a, a protrusion 36a at the other end of shank 34a, a first slot 38a, and a second slot 41a substantially perpendicular to slot 38a. The second slot 41a is provided in lieu of the broached flats 42 in the embodiment of Figures 4 and 5, and forms four legs 39a, so that the protrusions 36a at the end of the stud may be compressed in two directions to permit easy insertion of stud 30a into spectacle hinge hole 40. The stud 30a is used in the same way as the stud 30 of Figures 2–4.

In commercial use, the threadless hinge pivot and fastener of this invention should preferably have a shank that is a substantially true cylinder and is in frictional engagement throughout with the hinge aperture 40 so that it provides enough tension to keep the lens frame 20 snug with the temple frame members 22 and prevent sagging of the lens frame 20. It is also desirable that the hinge pivot stud be able to take up slack when wear increases the diameter of hinge aperture 40 or reduces the diameter of the stud.

In Figures 6–8 there is disclosed another embodiment of hinge pivot stud generally indicated at 30b that is especially suited to obtain these objectives. For clarity, like parts of the hinge stud 30b in this embodiment are given the same identifying numerals as in the embodiments of Figures 2–4, with the subscript b.

The hinge stud 30b comprises an enlarged head 32b, a cylindrical shank 34b, a slot 38b forming a pair of legs 39b, and enlarged protrusions 36b at the other end thereof with broached flats 42b, as in the embodiments of Figures 2–4. An axial bore 44 is provided in the center of the stud shank 34b extending from the protrusion end. In a typical embodiment wherein shank 34b is of .060 of an inch in diameter and the diameter across protrusions 36b .068 inch, bore 44 is approximately .030 of an inch in diameter. A suitable spring means such as the U-shaped wire spring 46, shown before assembly in Figure 8, is inserted in the bore 44 of the hinge stud as shown in Figures 6 and 7. In a typical commercial embodiment the spring 46 could be formed of .01 inch piano spring wire. The U-springs 46 lend themselves to commercial production methods on existing automatic screw machines with relatively economical modification of such equipment. It will be apparent that when the shank of stud 30b, or the spectacle hinge aperture 40 wears during use, the resilient U-spring 46 will urge the legs 39b outwardly to take up slack resulting from such wear, and thus maintain the tension needed to keep the lens frame snug with the temple parts of the frame.

In Figure 9 there is disclosed another embodiment of hinge pivot stud 30c, which is usable with a conventional threaded hinge generally indicated at 24c. For clarity, like parts of this embodiment are given the same identifying numerals as in the embodiments of Figures 2–4, but with the subscript c.

The conventional hinge 24c includes a pair of cooperating sections 26c and 28c having mating bores providing a hinge hole 40c. The lower section of hinge member 26c has a threaded bore 50 which is therefore of smaller diameter than the remainder of hinge hole 40c, and normally receives a conventional threaded hinge screw.

The pivot stud 30c comprises an enlarged head 32c, a cylindrical main shank 34c, a second smaller cylindrical shank section 52 adapted to cooperate with threaded hinge bore 50, protrusions 36c at the other end of the stud shank, and a longitudinal slot 38c which permits the protrusions 36c to be compressed. The stud 30c is used in substantially the same way as stud 30 of Figures 2–4, but its reduced section 52 makes it possible to insert and remove the stud 30c from a conventional threaded hinge without drilling out the threaded section of hinge hole or any other further work. Hence, the modified stud 30c overcomes the objections that opticians and others might have to using the novel threadless pivot and fastener stud of this invention with existing spectacles having a threaded hinge.

The operation and use of my novel threadless hinge assembly 24 and new hinge pivot stud and fastener 30 will be apparent to those skilled in the art from the foregoing discussion and further amplification is believed unnecessary. It will be apparent from the foregoing discussion, that my new threadless spectacle hinge 24 incorporating pivot stud and fastener provides a device whereby the hinge pivot is securely locked in place so it cannot fall out of the hinge, thereby eliminating inadvertent disassembly of the spectacle and lens breakage; that this new hinge pivot stud and fastener can be quickly and easily inserted and removed from hinge for quick, convenient assembly and disassembly of the spectacle without special tooling; that this new hinge combination and pivot means afford substantial savings to the manufacturer by eliminating tapping of the hinge holes and relatively slow screw assembly; that the new hinge and pivot stud can be easily and simply handled by dispensing opticians; and that the pivot stud is of such construction that it can be made to close tolerances in the order of .001 inch insisted upon by the optical industry.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spectacle hinge pivot stud comprising a main shank portion having a substantially cylindrical plain surface; an enlarged head at one end of said main shank portion; a smaller shank portion having a substantially cylindrical plain surface at the other end of said main shank portion; at least one enlarged protrusion adjacent the end of said smaller shank portion; at least one slot extending through at least a part of the length of said smaller shank portion from the protrusion end toward the head end of the stud so that the stud shank has at least two leg portions that are resiliently compressible towards each other to thereby reduce the distance between the outermost portion of said protrusion and the stud axis.

2. A stud comprising: an unthreaded main shank portion; an enlarged head at one end of said main shank portion; a smaller unthreaded shank portion at the other end of said main shank portion: said stud shank having a slot extending therethrough substantially axially thereof for at least a part of its length from the end opposite said head so that the stud shank has a pair of leg portions that are resiliently compressible towards each other; and a protrusion on each leg portion extending outwardly of the smaller shank portion whereby said protrusion can be displaced towards the axis of said stud by compressing said leg portions toward each other so that the stud can be inserted into and removed from a hole of smaller diameter than the maximum dimension across said protrusions.

3. For use in a spectacle frame having a lens frame portion, temple frame members, with hinges for connecting said lens and temple frame members, each of said hinges comprising first and second hinge members having interconnecting portions with a pair of different size bores therethrough in cooperating relationship to provide a hinge hole the smaller of said bores being threaded, a pivot stud comprising: an unthreaded main shank portion; an enlarged head at one end of said main shank portion; a smaller unthreaded shank portion at the other end of said main shank portion; said stud shank having at least one slot extending therethrough substantially axially thereof from the end opposite said head for at least a part of the length of said main shank portion so that said stud has a plurality of leg portions resiliently compressible toward each other; and a protrusion on at least one of said leg portions extending outwardly of the smaller shank portion whereby said protrusion can be displaced toward the axis of said stud by compressing said leg portions toward the stud axis.

4. A spectacle frame hinge comprising: first and second hinge members having interconnecting portions with a bore through each in cooperating relationship to provide a cylindrical hinge hole; a pivot stud in said hinge hole, said stud having a head at one end larger than the diameter of said hole, a shank portion received within said hinge hole, at least one protrusion on the other end of said shank portion for preventing displacement thereof in said hole in the direction of said head, and at least one slot in said shank portion extending from the protrusion end thereof towards the head end of the pivot stud for at least a part of the length of said shank, forming at least a pair of resilient legs, whereby the outermost portion of said protrusion can be displaced towards the stud axis by compression of said leg portions so that the stud can be inserted and removed from said hinge hole, said shank part of the stud being cylindrical for at least a major part of its length and of such diameter that it is received in said hinge hole in frictional engagement with the wall thereof; and the total length of said stud shank between its enlarged head and said protrusion being substantially equal to, but slightly greater than, the total length of the hinge hole.

5. A spectacle frame hinge as defined in claim 4, wherein: said stud shank further comprises a smaller shank portion having an unthreaded cylindrical surface of lesser diameter than said first-mentioned shank portion, interposed between said first-mentioned shank portion and the enlarged protrusion end of the stud, said slot extending through said smaller shank portion and through at least a part of said first-mentioned shank portion.

6. A spectacle frame hinge comprising: first and second hinge members having interconnecting portions, with a pair of different sized bores therethrough in cooperating relationship, providing a hinge hole including substantially aligned cylindrical sections of larger and smaller diameter, the smaller diameter section being threaded; a pivot stud in said hinge hole, said stud comprising an unthreaded main shank portion received in the larger diameter bore of said hinge hole, an enlarged head at one end of said main shank portion, a smaller unthreaded shank portion at the other end of said main shank portion received in the smaller diameter bore of said hinge hole, said stud shank having at least one slot extending therethrough substantially axially thereof from the end opposite said head and for at least a part of the length of said main shank portion whereby said stud has a plurality of legs resiliently compressible toward each other, and a protrusion on at least one of said legs extending outwardly of the smaller shank portion whereby said protrusion can be displaced toward the axis of said stud by compressing said leg portions toward the stud axis, to remove the pivot stud from the hinge hole.

7. A spectacle hinge pivot stud comprising: a main shank portion having an unthreated cylindrical surface with a diameter in the order of .060 of an inch; an enlarged head at one end of said shank; an unthreaded smaller shank portion having a cylindrical surface of lesser diameter than said main shank portion at the other end of said main shank portion; and at least one enlarged protrusion adjacent the end of said smaller shank portion; at least one slot extending through said smaller shank portion and through at least a part of said main shank portion from the protrusion end toward the head end so that said stud shank has at least two leg portions that are resiliently compressible toward each other to thereby reduce the distance between the outermost portion of the protrusion and the stud axis.

8. A spectacle frame hinge as defined in claim 4 which comprises one slot in said cylindrical part of the stud shank extending from said protrusion end towards said head end, thereby forming a pair of resilient legs, with a protrusion on each of said pair of legs, said protrusions extending between a pair of substantially parallel lines substantially perpendicular to the axis of said slot and spaced about the same distance as the diameter of said cylindrical shank part of the stud.

9. A spectacle frame hinge as defined in claim 4 which comprises first and second slots substantially perpendicular to each other extending through said cylindrical shank part of the stud from the protrusion end thereof towards the head end thereof, so that the stud has four leg portions resiliently compressible towards the stud axis, with a protrusion on each of said four leg portions extending outwardly from said cylindrical shank part of the stud.

10. A spectacle frame hinge as defined in claim 4 which comprises a slot in said cylindrical shank part of the stud extending from said protrusion end towards said head end of the stud, thereby forming a pair of leg portions, with a protrusion on each of said leg portions extending outwardly of said cylindrical shank part of the stud, and a spring means within said slot urging said leg portions away from the stud axis.

References Cited in the file of this patent
UNITED STATES PATENTS

| | | |
|---|---|---|
| 842,304 | Deming | Jan. 29, 1907 |
| 1,393,139 | Kiesel | Oct. 11, 1921 |
| 1,470,201 | Spracklen | Oct. 9, 1923 |
| 1,616,965 | Fielding et al. | Feb. 8, 1927 |
| 2,036,551 | Stevens | Apr. 7, 1936 |
| 2,266,758 | Holtz | Dec. 23, 1941 |
| 2,272,552 | Field | Feb. 10, 1942 |